United States Patent [19]

Brown

[11] 3,758,868

[45] Sept. 11, 1973

[54] NOISE-RIDING SLICER

[75] Inventor: Bruce J. Brown, Alexandria, Va.

[73] Assignee: The United States of America as represented by the Secretary of the Navy

[22] Filed: Dec. 21, 1971

[21] Appl. No.: 210,412

[52] U.S. Cl. .................. 328/165, 307/235, 307/237, 328/116, 328/175

[51] Int. Cl. .................. H03k 5/08

[58] Field of Search .................. 307/237, 264; 328/116, 149, 165, 171, 175

[56] References Cited

UNITED STATES PATENTS

| | | | |
|---|---|---|---|
| 3,144,554 | 8/1964 | Whitney | 328/165 X |
| 3,130,371 | 4/1964 | Copeland | 307/237 X |
| 3,576,451 | 4/1971 | Markow | 307/237 X |

*Primary Examiner*—John Zazworsky
*Attorney*—R. S. Sciascia, Arthur L. Branning et al.

[57] ABSTRACT

A noise-slicing device for substantially eliminating the noise from an input signal consisting of signal pulses riding in a background of noise. The input signal is fed through an electronic attenuator into an output comparator which provides an output whenever its input-signal level is above a reference voltage, 2 $V_{ref}$. A feedback loop provides a control signal to the attenuator to automatically control the attenuation level. The input to the feedback loop is the output of the attenuator. The loop comprises comparator means providing an output when the attenuator output signal is above its reference voltage, $V_{ref}$, a one-shot multivibrator, summing means having $-V_{ref}$ as one input and the M-V output as the other, an integrator and a limiter, the attenuator control signal being the output of the integrator.

3 Claims, 2 Drawing Figures

PATENTED SEP 11 1973 3,758,868

NOISE-RIDING SLICER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a noise-slicing device and especially to a noise-slicing device which automatically adjusts the slicing level as the noise level varies.

In a signal-processing system, an important operation is the extraction of analog pulses riding in a background of noise and the conversion of these pulses into a digital signal suitable for further processing by standard 5-volt logic circuits. In the past, the analog-to-digital conversion of a signal has been accomplished by a voltage comparator with a variable voltage divider providing its reference-voltage (negative terminal) input. To operate properly, it is necessary to observe the input signal and the reference voltage ($V_{ref}$) level simultaneously on a dual-channel oscilloscope and to adjust $V_{ref}$ to a level slightly greater than the noise so that only the signal is detected. If $V_{ref}$ is set too high, the signal will not be detected. Since most signal processors have numerous channels with each channel requiring a circuit such as just described, it is necessary to properly adjust $V_{ref}$ for each circuit. In addition to those time-consuming adjustments, a serious problem with the circuit occurs under varying noise-level conditions. If $V_{ref}$ is set for a particular noise level and that noise level increases, numerous unwanted pulses, due to $V_{ref}$ "slicing" into the input noise peaks, appear at the output of the voltage comparator.

SUMMARY OF THE INVENTION

The present invention provides a solution to the above problem by automatically varying the input signal (consisting of signal pulses and noise) by means of an electronic attenuator to maintain a constant difference between a fixed reference level and the attenuated peak noise level (or any other measure of the noise level). The attentuation level is monitored by applying the output of the attenuator to a feedback loop which compares the output of the attenuator to a fixed reference voltage and operates to provide a control signal for the attenuator to maintain its attenuation at the proper level.

An object of this invention is to automatically maintain a constant difference between a fixed reference voltage and the noise level of an input signal consisting of signal pulses riding in a background of noise.

Another object is to automatically slice the noise from a signal consisting of signal pulses in a background of noise and to provide a digital pulse for each incoming signal pulse, regardless of any variations in the noise level of the incoming signals.

Other objects, advantages and novel features of the invention will become apparent from the following detailed description of the invention when considered in conjunction with the accompanying drawings wherein:

DETAILED DESCRIPTION

Figure 1:
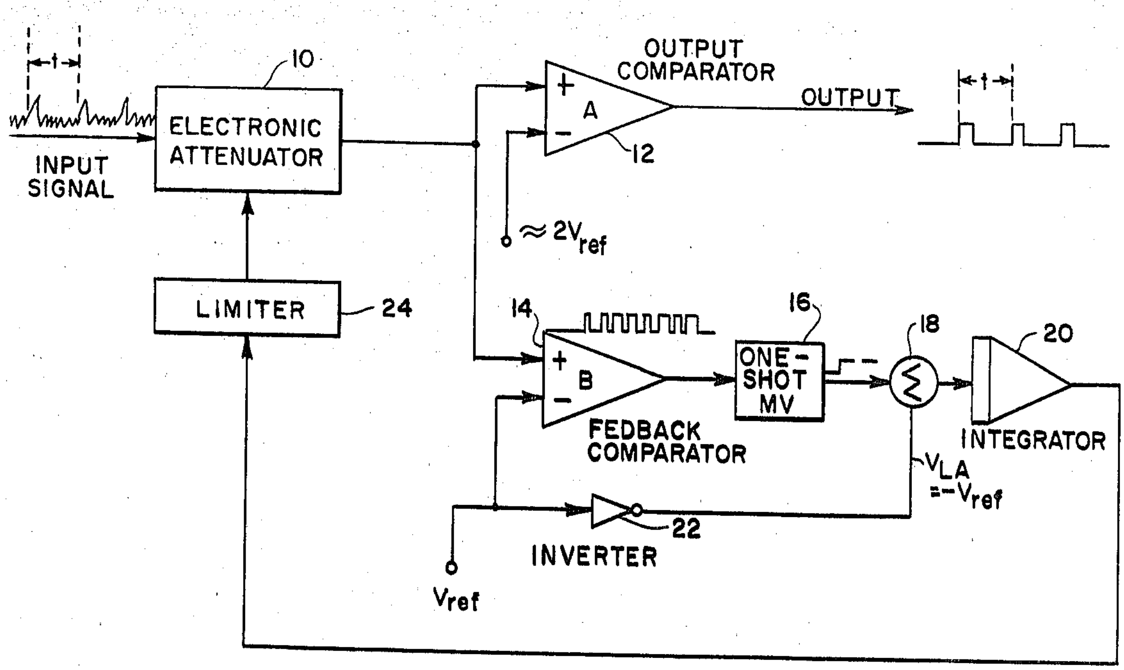
FIG. 1 is a block diagram of an embodiment of the invention.

FIG. 1 illustrates an embodiment of the invention in which an electronic attenuator is controlled so that the noise level (actually the complete input signal which includes pulse signals riding in a background of noise) is adjusted so that a reference voltage will lie close to the peaks of the attenuated noise spikes. The exact adjustment of the attenuated noise level with respect to the reference voltage (or vice versa) is not important just as long as the reference voltage level lies below and close to the peaks of the attenuated noise spikes. Generally speaking, the peaks of the noise impulses will differ in amplitude but, except for occasional impulses, the peak amplitudes will not exhibit too great a variation. It could be said that the average of the amplitudes of the peaks of the noise impulses will constitute a measure of the noise. This measure will be designated as the peak noise level herein.

The feedback, or control, loop includes the feedback comparator 14, a one-shot multivibrator 16, a summer 18, and integrator 20, a source of reference voltage, $V_{ref}$, and an inverter 22. The voltage comparators are circuits which provide a positive output level (e.g., 5 volts) if the input signal applied to the positive (+) terminal exceeds the level of the input signal applied to the negative (−) terminal.

Assume now that there is no attenuation of the input signal and that the noise peaks are well above the level of $V_{ref}$. The output of the feedback comparator 14 is a series of closely spaced pulses corresponding to the noise spikes which exceed $V_{ref}$ in voltage.

The one-shot multivibrator 16 is set to have a period which is longer than the time period of successive noise spikes but shorter than the period of the expected pulse signals. Therefore the output of the MV (multivibrator) 16 will be a signal of fixed level (e.g., 5 volts) since the MV will be immediately fired at the end of each period.

Assume $V_{ref}$ is about 0.7 volts, which has been found to be a practical level. $V_{ref}$ is inverted by the inverter 22 to provide a negative voltage at the summer 18 to be subtracted from the output of the MV 16. The subtractive voltage, $V_{LA}$, is the level-adjust voltage, the voltage which determines where the $V_{ref}$ level will be relative to the attenuated peak noise level. It is convenience to make $V_{LA}$ the same as $-V_{ref}$, although this is not necessary. The resultant voltage from the summer 18 which, in this case, is positive is applied to the integrator 20 causing the integrator output to become more and more positive.

The integrator output is applied to a limiter 24, which protects the attenuator 10 from being burned out, and the limiter output is applied to the electronic attenuator 10 to control its attenuation level — as the input from the limiter becomes more positive the attenuation increases.

Under the conditions described, the limiter output is becoming more positive and the attenuation is increasing; therefore, the attenuated noise level goes down with respect to $V_{ref}$. This means that fewer noise peaks rise above $V_{ref}$ to provide output pulses in the output signal from the feedback comparator 14. A point is reached where the one-shot MV 16 may not be fired immediately after its period ends and the output from the MV 16 may be simply a series of pulses between the signal pulses (the duty cycle of the MV decreases). The integrator output becomes less positive and the attenuation may decrease. A condition of equilibrium between these opposing tendencies occurs at some level of attenuation where the level $V_{ref}$ is somewhere near the attenuated peak-noise level. The value of $V_{LA}$ determines how much attenuation will be provided and where $V_{ref}$ will lie relative to the attenuated peak noise level.

Figure 2:
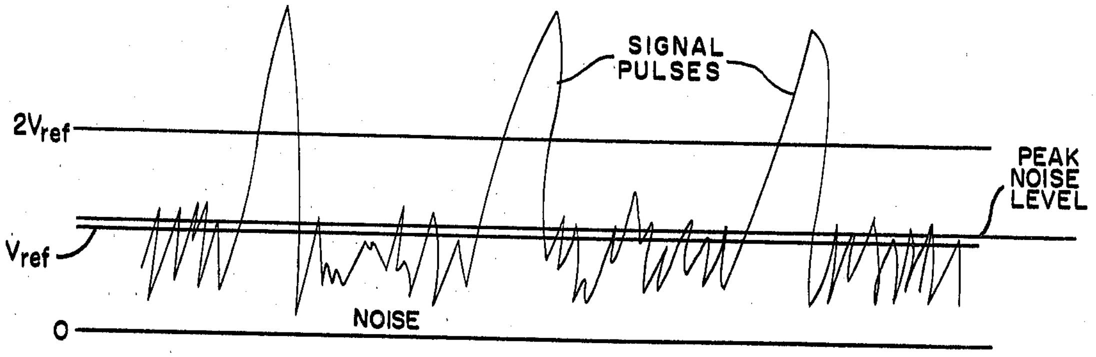
FIG. 2 is an illustration of the attenuator output signal waveform and the reference voltage levels.

Once the attenuation level is established so that $V_{ref}$ rides just below the attenuated noise peaks, it is apparent that the reference level at the negative input to the output comparator 12, if set to a higher value than $V_{ref}$ (e.g., 2 $V_{ref}$), will be exceeded by very few noise peaks but will be exceeded by the input pulses to provide a clean output signal having a pulse of fixed amplitude each time an input pulse is received. The level of the reference signal at the negative input terminal of the output comparator 12 is set somewhere below the input-pulse peak voltage but sufficiently above the peak noise level so that very few noise peaks exceed it. This is indicated by FIG. 2 where $2V_{ref}$ lies above the attenuated noise peaks but below the signal-pulse peaks. The voltage difference between the lines labeled "Peak Noise Level" and "$V_{REF}$" in FIG. 2 is kept constant by the feedback loop, the feedback loop being dependent only on the noise component of the output of the attenuator 10.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A noise-slicing device for automatically substantially eliminating the noise impulses from an input signal applied thereto consisting of signal pulses in a background of noise impulses comprising, in comination:

electronic attenuator means for attenuating its own input signal in accordance with the magnitude of a control signal, said input signal and control signal being applied as inputs thereto;

feedback means connected to receive the output of said attenuator means as a first input signal and a reference voltage as a second input signal, for converting the output signal of said attenuator means into said control signal for said attenuator means, said feedback means acting to maintain a fixed difference between said reference voltage level and the peak noise level of the output signal from said attenuator means;

output comparator means connected to receive the output of said attenuator means as a first input signal and having a second reference voltage as a second input signal for comparing the voltage levels of its two input signals and providing an output pulse whenever the voltage of its first input signal rises above the level of said second reference voltage, said second reference voltage level being substantially above the peak amplitudes of the noise impulses but below the peak amplitudes of the signal pulses in the input signal received by the noise-slicing device.

2. A noise-slicing device as in claim 1, wherein said feedback means comprises:

means providing a fixed reference voltage;

feedback voltage comparator means having as input signals the output of said attenuator means and said reference voltage, said comparator means providing a fixed-amplitude output voltage whenever the level of the attenuator output signal rises above the level of said reference voltage;

means, receiving the output of said comparator means as an input, for providing for a fixed period a fixed-level output signal when triggered by a signal at its input, said fixed period covering the time duration of several noise impulses but being less than the period of the signal pulses coming into the noise-slicing device;

inverter means, receiving as an input said fixed reference voltage, for inverting the polarity of said reference voltage;

summing means, receiving as inputs the output of said MV means and said inverter means, for adding its two input voltages; and integrator means, receiving the output of said summing means as an input, for integrating its input signal and providing said control signal for said electronic attenuator means.

3. A noise-slicing device as in claim 2, further including limiter means, receiving the output of said integrator means as an input, for limiting the peak amplitude of said control signal before it is applied to said attenuator means.

* * * * *